United States Patent [19]

Tanaka et al.

[11] Patent Number: 4,956,418

[45] Date of Patent: Sep. 11, 1990

[54] IONOMER RESIN AND PREPARATION OF SAME

[75] Inventors: Masato Tanaka; Shuji Machida, both of Sodegaura, Japan

[73] Assignee: Idemitsu Kosan Company Limited, Tokyo, Japan

[21] Appl. No.: 178,235

[22] Filed: Apr. 6, 1988

[30] Foreign Application Priority Data

Apr. 30, 1987 [JP] Japan .................. 62-104530

[51] Int. Cl.$^5$ .................. C08F 8/42; C08F 30/04
[52] U.S. Cl. .................. 525/330.6; 526/241
[58] Field of Search .................. 526/241; 525/330.6

[56] References Cited

U.S. PATENT DOCUMENTS 2,626,945  1/1953  Carlin .................. 526/241
3,789,035  1/1974  Iwami et al. .................. 526/241

FOREIGN PATENT DOCUMENTS 61-043613  3/1986  Japan .................. 525/119
6511920  3/1967  Netherlands .................. 526/241
1011981  12/1965  United Kingdom .

Primary Examiner—Joseph L. Schofer
Assistant Examiner—N. Sarofim
Attorney, Agent, or Firm—Frishauf, Holtz, Goodman & Woodward

[57] ABSTRACT

An ionomer resin having a weight-average molecular weight of at least 5,000 and containing three specific repeating units as the primary components, said units being arranged randomly and linearly with the total proportion of the two units being 0.001 to 45 mol %, is obtained by copolymerizing ethylene with an unsaturated carboxylic acid in the presence of a Lewis acid, using as a catalyst a chromium compound and a compound of a metal of Groups I to V in the periodic table and permitting a compound of a metal of Group I, II, III, IVA or VIII in the periodic table to react with the resulting copolymer. When an unsaturated carboxylic ester is used, the resulting copolymer is hydrolyzed or thermally decomposed.

8 Claims, 3 Drawing Sheets

IONOMER RESIN AND PREPARATION OF SAME

BACKGROUND OF THE INVENTION

The present invention relates to an ionomer resin and a method for the preparation thereof and, more particularly, to an ionomer resin which is of a novel chemical structure and excels in mechanical strength, oxygen gas barrierring ability and an efficient method for the preparation thereof.

Heretofore, polyolefin resins have found use in wide applications due to a number of excellent properties, but have offered problems in connection with printability and dyeing properties because of chemical inertness. In one metnod proposed to solve these problems, olefins are copolymerized with polar vinyl monomers. In another method for that purpose, olefins are copolymerized with polar vinyl monomers, followed by crosslinking with metal ions (Japanese Patent Publication No. 39(1964)-6810). The resins obtained by the latter method in particular have been named the ionomer resins by R. W. Rees, et al and, since then, inomer resins of various structures have been proposed in the art. These ionomer resins are typically represented by ethylene-methacrylic acid copolymers obtained by the high-pressure process and crosslinked with $Na^+$ or $Zn^{++}$. However, they are still found to be unsatisfactory in terms of heat resistance, mechanical strength, oxygen gas barrierring ability and so on.

SUMMARY OF THE INVENTION

In view of the foregoing, a primary object of the present invention is to provide a novel ionomer resin in which, unlike the prior art ionomer resins as mentioned above, two specific repeating units are randomly arranged in basic repeating units of linearly polymerized ethylene.

More specifically, according to one aspect of the present invention, there is provided an ionomer resin having a weight-average molecular weight of at least 5,000 and containing as the primary components:

(A) a repeating unit expressed by:

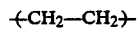  (I)

(B) a repeating unit expressed by:

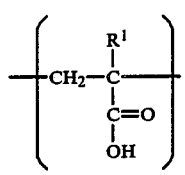  (II)

wherein $R^1$ stands for a hydrogen or halogen atom, an alkyl group having 1 to 20 carbon atoms, a cycloalkyl group having 3 to 20 carbon atoms, an aryl group having 6 to 20 carbon atoms or an aralkyl group having 7 to 20 carbon atoms, and (C) a repeating unit expressed by:

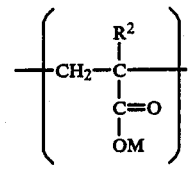  (III)

wherein $R^2$ stands for a hydrogen or halogen atom, an alkyl group having 1 to 20 carbon atoms, a cycloalkyl group having 3 to 20 carbon atoms, an aryl group having 6 to 20 carbon atoms or an aralkyl group having 7 to 20 carbon atoms, and M denotes an ion of a metal of Group I, II, III, IVA or VIII in the periodic table;

said repeating units being arranged randomly and linearly with the total proportion of said repeating units (B) and (C) contained being 0.001 to 45 mol %.

According to another aspect of the present invention, there is provided a method for preparing such ionomer resins, wherein:

ethylene is copolymerized with an unsaturated carboxylic acid in the presence of a Lewis acid, using as a catalyst a chromium compound and a compound of a metal of Groups I to V in the periodic table, thereby obtaining an ethylene-unsaturated carboxylic acid copolymer; and a compound of a metal of Group I, II, III, IVA or VIII in the periodic table is permitted to react with said copolymer.

According to a further aspect of the present invention, there is provided a method for preparing such ionomer resins, wherein:

ethylene is copolymerized with an unsaturated carboxylic ester in the presence of a Lewis acid, using as a catalyst a chromium compound and a compound of a metal of Groups I to V in the periodic table, thereby obtaining an ethylene-unsaturated carboxylic ester copolymer;

said copolymer is subjected to hydrolysis or thermal decomposition; and a compound of a metal of Group I, II, III, IVA or VIII in the periodic table is then permitted to react with the resulting product.

DETAILED DESCRIPTION OF THE INVENTION

Figure 1:
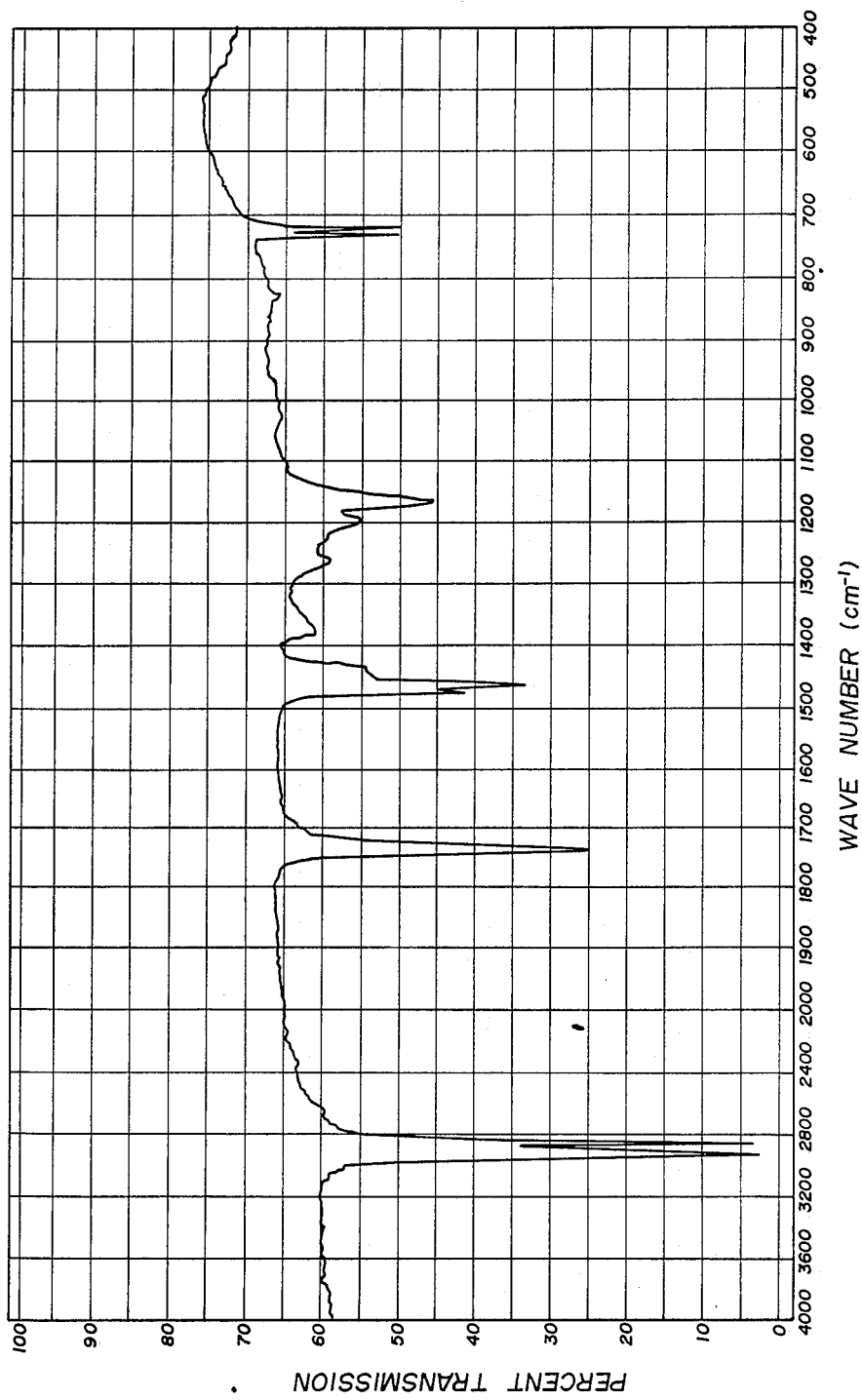
FIGS. 1 to 3 show the infrared absorption spectra of the copolymer obtained at respective stages in Example 1.

The ionomer resins of the present invention consist essentially of, or contain as the main components, the first repeating unit (A) expressed by Formula I (i.e., the unit of ethylene), the second repeating unit (B) expressed by Formula II (i.e., the unit of acrylic acid or its derivative) and the third repeating unit (C) expressed by Formula III (i.e., the unit of a metal salt of acrylic acid or its derivative), said three repeating units being arranged randomly and linearly. In other words, the ionomer resins of the present invention are free from such a branched long chain as found in the ethylene-unsaturated carboxylic acid copolymers obtained by the high-pressure radical process. Nor is any substantial portion where the repeating units (B) or (C) are polymerized in the block form found.

When the aforesaid three repeating units are contained as the primary components, a small amount of a fourth repeating unit (D) having a short-chain alkyl branch, as expressed by the following formula IV:

wherein $R^3$ stands for an alkyl group, such as a methyl or ethyl group, may be introduced in the reaction of ethylene with the unsaturated carboxylic acid or its ester. Such a short-chain alkyl branch is formed depending upon the reaction conditions selected, and may occur easily, for instance, if the total proportion of the repeating units (B) and (C) contained exceeds about 2 mol % or the reaction takes place at a temperature exceeding 30° C. Such an alkyl branch may also be formed by the incorporation of alpha-olefins such as propylene, 1-butene, 1-pentene and 4-methylpentene-1.

The ionomer resins of the present invention have a total proportion of the repeating units (B) and (C) ranging from 0.001 to 45 mol %, preferably 0.1 to 20 mol % and a weight-average molecular weight of no lower than 5,000, usually 10,000 to 2,000,000.

Although varying with type of $R^1$, the repeating unit (B) expressed by Formula II may be a acrylic acid, methacrylic acid, alpha-chloroacrylic acid or alpha-phenylacrylic acid unit, by way of example.

Although varying with the types of $R^2$ and M, the repeating unit (C) expressed by Formula III may be, by way of example, sodium acrylate, potassium acrylate, lithium acrylate, calcium acrylate, magnesium acrylate, zinc acrylate, tin acrylate, aluminium acrylate, iron acrylate, sodium methacrylate, lithium methacrylate, calcium methacrylate, zinc methacrylate, tin methacrylate, copper methacrylate, aluminium methacrylate, iron methacrylate, sodium α-chloroacrylate, calcium α-chloroacrylate, lead α-chloroacrylate, tin α-chloroacrylate, copper α-chloroacrylate, aluminium α-chloroacrylate, iron α-chloroacrylate, sodium α-phenyl acrylate, calcium α-phenyl acrylate, zinc α-phenyl acrylate, tin α-phenyl acrylate, copper α-phenyl acrylate, aluminium α-phenyl acrylate and iron α-phenyl acrylate units.

The ionomer resins of the present invention may be prepared by various methods. Practically, however, they are prepared by the methods as mentioned in the foregoing. That is, ethylene is copolymerized with the unsaturated carboxylic acid or ester in the presence of a Lewis acid, using as a catalyst a chromium compound and a compound of a metal of Groups I to V of the periodic table, thereby obtaining copolymers of ethylene with the unsaturated carboxylic acid or ester.

Reference will now be made to concrete examples of the chromium and organic metallic compounds. The chromium compounds used may be one or more compounds selected from the group consisting of chromium carboxylates such as chromium acetate, chromium stearate, chromium-2-ethylhexoate, chromium benzoate and chromium naphthanoate or their anhydrides, esters, ethers and ketone adducts; chromium alkoxides such as tetramethoxychromium, tetraethoxychromium, tetra-n-butoxychromium, chromium dichloride; chromium xylate compounds such as chromium trisacetylacetonate, chromium tris(2-methyl-1,3-butanedionate), chromium tris(trifluoroacetylacetonate) and chromium tris(hexafluoroacetylacetonate); chromium π-complexes such as biscyclopentadienyl-chromium, bisbenzene-chromium, diphenylbenzene-chromium and dihexamethylbenzene-chromium; chromium aryl compounds such as diphenyl chromium and tetraphenyltristetrahydrofuran chromium; and chromium halides such as chromium trichloride, chromium tribromide, chromium triiodide, chromium dichloride and chromium dibromide. As the organic metallic compounds, use may be made of organic compounds of metals of Groups I to V of the periodic table, which, by way of example, include methyllithium, ethyllithium, butyllithium, diethylmagnesium, ethylbutylmagnesium, dimethylzinc, diethylzinc, dibutylzinc, trimethylgallium, triethylgallium, tributylgallium, triethylboron, tetraethyltin, trimethylaluminium, triethylaluminium, tri-isopropylaluminium, tri-isobutylaluminium, dimethylaluminium monochloride, diethylaluminium monochloride, diethylaluminium monoboromide, di-isopropylaluminium monochloride, diisobutylaluminium monochloride, methylaluminium sesquichloride, ethylaluminium sesquichloride, ethylaluminium sesquibromide, ethylaluminium dichloride and ethylaluminium dibromide. Use may also be made of alkyl group-containing aluminoxane formed by the reaction of alkyl aluminium with water.

If required, carboxylates, organic phosphates, halides and alkoxides of other metals may optionally be added.

Various Lewis acids may be used, and include aluminium chloride, aluminium boromide, ethylaluminium dichloride and diethyl aluminium chloride, by way of example.

Concrete examples of the unsaturated carboxylic acids or esters for reaction with ethylene include acrylic acid, methacrylic acid, α-chloroacrylic acid, α-phenylacrylic acid, methyl acrylate, ethyl acrylate, propyl acrylate, butyl acrylate, n-octyl acrylate, 2-ethylhexyl acrylate, benzyl acrylate, methyl methacrylate, ethyl methacrylate, butyl methacrylate, 2-ethylhexyl methacrylate, phenyl methacrylate, methyl α-chloroacrylate and ethyl α-chloromethacrylate.

Aliphatic, aromatic, alicyclic and halogenated hydrocarbons may be used as the solvents for copolymerization, and include pentane, hexane, heptane, octane, decane, dodecane, kerosine, xylene, toluene, benzene, cyclohexane, ethylbenzene, chlorobenzene and ethylene dichloride.

Copolymers of ethylene with the unsaturated carboxylic acids or esters are obtained by copolymerization. The latter copolymers are converted to the copolymers of ethylene with the unsaturated carboxylic acids by hydrolysis or thermal decomposition, while a part of the ester groups may or may not be allowed to remain.

A specific metallic compound is then permitted to react with the copolymers of ethylene with the unsaturated carboxylic acids to effect ionization crosslinking where the carboxyl groups of the copolymers are replaced by metal ions, thereby obtaining the desired ionomer resins.

In the present disclosure, the "metallic compounds" refer to compounds of metals belonging to Groups I, II, III, IVA and VIII in the periodic table and, by way of example, include preferably water-soluble organic acid salts e.g., formates and acetates, hydroxides, alkoxides e.g., methoxides and ethoxides, nitrates, carbonates and bicarbonates of sodium, potassium, lithium, cesium, silver, copper, mercury, beryllium, magnesium, strontium, barium, cadmium, zinc, scandium, aluminium, titanium, zirconium, osmium, iron, cobalt and nickel.

The crosslinking reaction of the ethylene-unsaturated carboxylic acid copolymers with the metallic compounds may be effected by hot mixing or solution reaction. This reaction gives the ionomer resins of the present invention, wherein a part, preferably 10 to 50%, of the carboxyl group of the repeating unit (B) in said copolymers, expressed by Formula II, is replaced by the metal ion.

Novel ionomer resins of the present invention are improved in regard of heat resistance, mechanical strength and $O_2$ barrier ability over the ionomer resins obtained by the ionization of conventional copolymers of ethylene with unsaturated carboxylic acids prepared by the high-pressure radical process, and can thus be effectively used as the materials for general goods and industrial products required to possess printability and dye properties.

For a better understanding of the present invention, the examples will now be given.

EXAMPLE 1

(1) Preparation of Chromium-Containing Catalyst Component

In a 300 ml-flask replaced therein with argon, put were 1.1 g (4.45 mmol) of chromium acetate-water salt [$Cr(CH_3COO)_3 \cdot H_2O$], 40 ml of acetic anhydride and 40 ml of acetic acid for 20 hours-reaction under agitation and reflux. Subsequent distillation of acetic acid and acetic anhydride under reduced pressure gave a green solid, which was in turn dried at 120° C. for 48 hours in an argon stream, and was cooled down with the addition of toluene, thereby obtaining 200 ml of a chromium-containing catalyst component slurry.

(2) Preparation of Copolymer

In an autoclave having an internal volume of 4.5 l, put were 2.8 l of dehydrated toluene, to which 213.6 mmol of a toluene solution of an equimolar mixture of ethyl acrylate and aluminium trichloride were then added. Next, 160 mmol of diethylaluminium chloride and 4 mmol of the chromium-containing catalyst component prepared as above were added at 30° C. under agitation. Then, the resulting product was saturated with hydrogen at 5 kg/cm$^2$G, and ethylene was continuously supplied to the autoclave, while maintaining a total pressure of 10 kg/cm$^2$G. After three hours-polymerization followed by depressurization, the resulting polymer was charged in methanol, and was filtered out and de-calcified by heating with a mixed liquid of hydrochloric acid and methanol under reflux. Then, the product was extracted from acetone for 5 hours to remove an amorphous polymer. Drying of the residues at 80° C. under reduced pressure for 2 hours gave 69.2 g of a white copolymer.

The thus obtained copolymer had a weight-average molecular weight of 51,000 and showed infrared absorption spectra as shown in FIG. 1. Analysis of the infrared absorption spectra have indicated that at 1730 cm$^{-1}$, 1160 cm$^{-1}$, 730 cm$^{-1}$ and 720 cm$^{-1}$ there are respectively absorptions based on the stretching vibration of the carbonyl group of ethyl acrylate, the ether bond, the methylene chain in the crystal region and the methylene chain in the amorphous region. The content of the ethyl methacrylate residue was found to be 3.0 mol % by these absorption intensities. Further, from the analysis of $^{13}$C-NMR spectra, it has turned out that the polymer chain is in the linear form, and has the ethyl acrylate residues introduced randomly therein.

(3) Hydrolysis of Copolymer

Ten (10.0) g of the ethylene-ethyl acrylate copolymer obtained in (2) were charged in 150 ml of ethanol, and 10 ml of an 1 N aqueous solution of sodium hydroxide and 30 ml of water were then added thereto for 3 hours-reaction under reflux. After the completion of the reaction, the product was cooled down to room temperature, and the copolymer was filtered out, washed with water, neutralized with dilute hydrochloric acid, and washed with water and acetone in that order. Subsequent drying at 80° C. under pressure for 2 hours gave a white solid copolymer.

Figure 2:
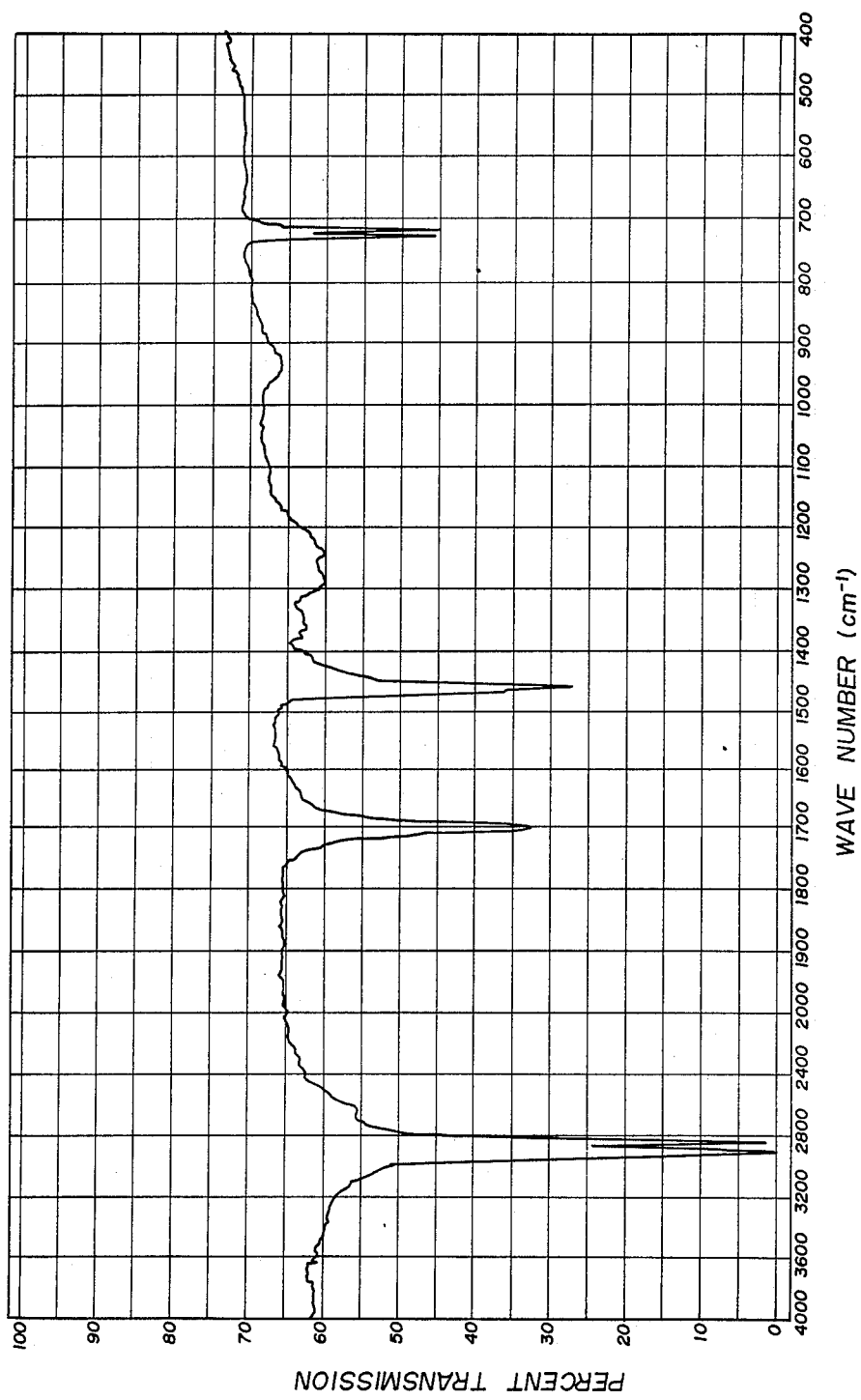

The infrared absorption spectra of the thus obtained copolymer are shown in FIG. 2. From the results of this analysis, it has been found that the absorptions, as observed in (2), based on the carbonyl group of the carboxylic ester and the ether bond disappear but, instead, new absorption based on the carbonyl group of the carboxylic acid appears at 1700 cm$^{-1}$. From this, it has turned out that the copolymer obtained in (2) was completely hydrolized to a copolymer of ethylene with acrylic acid. With DSC Model II manufactured by Perkin Elmer Co., Ltd., this copolymer was heat-treated at 180° C. for 3 minutes in a nitrogen gas, cooled down to 50° C. in 5 minutes, and heated at a heating rate of 10° C./min. As a result, the copolymer was found to have a melting point of 129° C. This copolymer was also found to have a melt index of 5.4 g/10 min., as measured at 190° C. under a load of 2.16 kg.

(4) Ionization of Copolymer

Eight (8) g of the (hydrolyzed) copolymer of ethylene with acrylic acid were dissolved in 100 ml of p-xylene, and 8 ml of an 1 N aqueous solution of sodium hydroxide were added dropwise to the resulting solution. Subsequent 30 minutes-reaction gave a gelled product which was then poured in hexanone for precipitation. The precipitates were washed with water and acetone in succession, and were dried at 80° C. under agitation for 2 hours to obtain an ionized copolymer.

Figure 3:
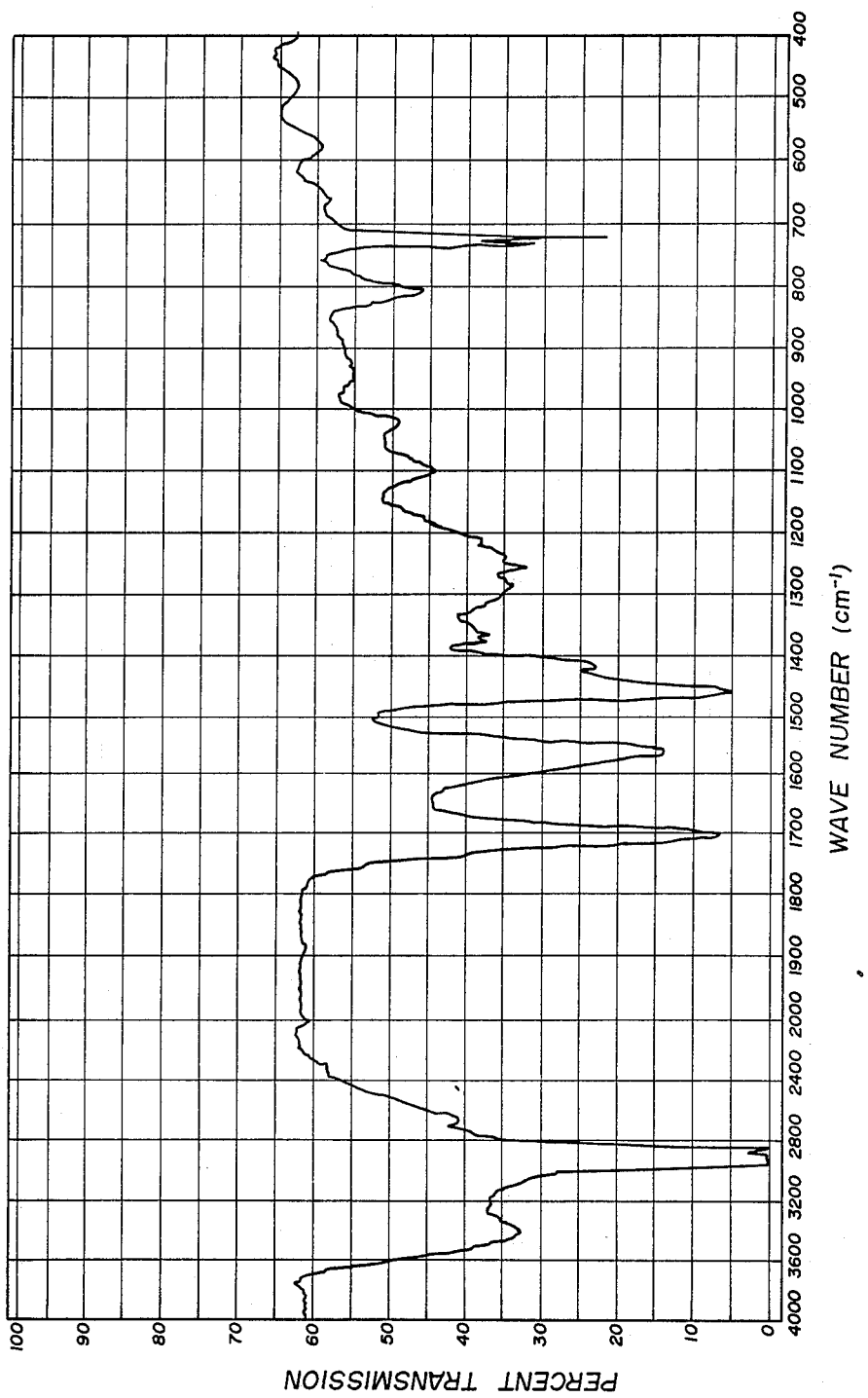

The infrared absorption spectra of the thus obtained ionized copolymer are shown in FIG. 3. The results of this analysis have indicated that a new asymmetrical vibration peak indicative of the ionized carbonyl group is found at 1560 cm$^{-1}$. The degree of ionization was 32.6%, as calculated from the absorbance at 1700 cm$^{-1}$ and 1560 cm$^{-1}$. After pressed at 190° C., this ionized copolymer was formed into a film by annealing at 100° C. for 10 minutes. This film has been found to have a crystallinity of 43.2%, as measured by X-ray diffraction (Rotar Flex, 35 KV and 120 mA) and calculated by the symmetrical reflection method.

The results of measurement of various properties of this ionized copolymer are set out in Table 1.

EXAMPLE 2

Example 1 was substantially repeated, except that the amount of sodium hydroxide added was 4 ml in Examples 1 (4). The results of measurement of various properties of the obtained ionized copolymer are set out in Table 1.

EXAMPLE 3

Example 1 was substantially repeated, except that the amount of a 0.1 N aqueous solution of sodium hydroxide was 8 ml in Example 1 (4). The results of measurement of various properties of the obtained ionized copolymer are set out in Table 1.

EXAMPLE 4

Example 1 was substantially repeated, except that 4 ml of an aqueous solution of zinc acetate were used in a concentration of 1 mol/l in place of the aqueous solution of sodium hydroxide in Example 1 (4). The results of measurement of various properties of the obtained ionized copolymer are set out in Table 1.

EXAMPLE 5

Example 1 was substantially repeated, except that 4 ml of an aqueous solution of lithium hydroxide were used in a concentration of 1 mol/l in place of the aqueous solution of sodium hydroxide in Example 1 (4). The results of measurement of various properties of the obtained ionized copolymer are set out in Table 1.

EXAMPLE 6

Similar operations as in Example 1 (3) were carried out, except that the reaction was permitted to take place for 3 hours under reflux with the addition of 2 ml of an 1 N aqueous solution of sodium hydroxide and 30 ml of water, thereby obtaining a copolymer having a degree of hydrolysis of 32%. The obtained copolymer was treated in a similar manner as in Example 1 (4). The results of measurement of various properties of the obtained ionized copolymer are set out in Table 1.

EXAMPLE 7

Similar operations as in Example 1 (2) were carried out, except that methyl acrylate was used for ethyl methacrylate, and the partial pressures of hydrogen and ethylene were 3 kg/cm$^2$G and 7 kg/cm$^2$G, respectively, thereby obtaining a copolymer which was found to have a methyl acrylate residue content of 4.7 mol % and a weight-average molecular weight of 32,600.

For hydrolysis, similar operations as in Example 1 (3) were carried out, except that the copolymer obtained as above was substituted for the ethylene-ethyl acrylate copolymer. The obtained ethylene-acrylic acid copolymer was found to have a melting point of 126° C. and a melt index of 3.9 g/10 min.

With the ethylene-acrylic acid copolymer obtained as above, Example 1 (4) was substantially repeated, except for dropwise addition of 4 ml of an 1 N aqueous solution of sodium hydroxide. The obtained ionized copolymer was found to have a degree of ionization of 16.4% with various properties given in Table 1.

EXAMPLE 8

For hydrolysis, similar operations as in Example 1 (3) were carried out, except that 70 g of the ethylene-methyl acrylate copolymer obtained in Ex. 7 were charged in 1 liter of methanol with subsequent addition of 100 ml of an 1 N aqueous solution of sodium hydroxide and 100 ml of water, thereby obtaining an ethylene-acrylic acid copolymer which was found to have a melting point of 126° C. and a melt index of 7.3 g/10 min.

Then, 65 g of the ethylene-acrylic acid copolymer (hydrolyzate) obtained as above were supplied to a LaboPlastomill (manufactured by Toyo Seiki Seisakusho, Co., Ltd.) where while kneaded together at 170° C., a solution of 2.8 g of sodium hydroxide dissolved in 20 ml of water was gradually added thereto and kneaded therewith at 50 rpm for 5 minutes, thereby obtaining an ionized copolymer which was found to have a degree of ionization of 14.5% with various properties shown in Table 1.

EXAMPLE 9

Similar operations as in Example 1 (2) were carried out, provided however that in place of the equimolar mixture of ethyl acrylate with aluminium trichloride, use was made of a 106.8 mmol, calculated as acrylic acid, of a mixture of acrylic acid and aluminium trichloride in a molar ratio of 1:3, thereby obtaining 37.4 g of a copolymer which was found to have a weight-average molecular weight of 58,600 and an acrylic acid residue content of 1.7 mol % as a result of the infrared-absorption-spectral analysis. This copolymer was also found to have a melting point of 131° C. and a melt index of 1.5 g/10 min.

Then, similar operations as in Example 1 (4) were carried out, provided however that the ethylene-acrylic acid copolymer obtained as above was used with dropwise addition of 20 ml of a 0.1 N aqueous solution of sodium hydroxide. The thus obtained ionized copolymer was found to have a degree of ionization of 12.5% with various properties shown in Table 1.

EXAMPLE 10

For the preparation of a copolymer, Example 9 was substantially repeated, except that methyl methacrylate was substituted for acrylic acid, thereby obtaining 16.7 g of the copolymer. The obtained copolymer was found to have a weight-average molecular weight of 44,400 and a methyl methacrylate residue content of 2.4 mol % as a result of the infrared-absorption-spectral analysis. This copolymer was also found to have a melting point of 128° C. and a melt index of 1.7 g/10 min.

For hydrolysis, similar operations as in Example 1 (3) were then carried out, except that use was made of the ethylene-methyl methacrylate copolymer obtained as above, thereby obtaining an ethylene-methacrylic acid copolymer.

Further, similar operations as in Example 1 (4) were performed, provided however that the ethylene-methacrylic acid copolymer obtained as above was employed as the copolymer, thereby obtaining an ionized copolymer having a degree of ionization of 14.6%. Various properties of that copolymer, as measured, are shown in Table 1.

EXAMPLE 11

Example 1 (2) was repeated, except that the pressure of hydrogen was 4 kg/cm$^2$G, and 76.2 g of an ethylene-acrylic acid copolymer having an acrylic acid residue content of 2.6 mol % were obtained.

Thereafter, hydrolysis and ionization procedures were carried out with similar operations as in Example 1 (3), (4). Various properties of the thus obtained ionomer are shown in Table 1.

After pressed at 190° C., this ionomer was formed into a sheet by annealing at 100° C. for 5 minutes. Test piece (100×100 mm) was prepared from the sheet having a thickness of 100 μm, and oxygen gas permeability index of the test piece was measured with M-C3 (manufactured by Toyo Seiki Seisakusho, Co., Ltd.). As the result, the oxygen gas permeability index of the test piece was 0.53×10$^{-10}$ cm$^3$·cm/cm$^2$·second·cmHg.

COMPARATIVE EXAMPLE 1

With an ethylene-acrylic acid copolymer obtained by the high-pressure process, having a branched molecular chain and possessing an acrylic acid residue content of 3.2 mol % and a melt index of 5.0 g/10 min., similar operations as in Example 1 were conducted, except that the amount of sodium hydroxide added was 4 ml, thereby obtaining an ionized copolymer. Various properties of that copolymer, as measured, are shown in Table 1 for the purpose of comparison. Oxygen gas permeability index of the ionized copolymer was 1.92 $cm^3$./$cm^2$·second·cmHg.

TABLE 1

|  | Degree of Ionization | Melting Point (°C.) | Melt Index (g/10 min.) | Crystallinity (%) | Density (g/$cm^3$) | Vicat Softening Point (°C.) | Breaking Strength (kg/$cm^2$) | Tensile Modulus of Elasticity (kg/$cm^2$) |
|---|---|---|---|---|---|---|---|---|
| Example 1 | 32.6 | 124 | 0.015 | 43.2 | 0.99 | 110 | 1100 | 85,600 |
| Example 2 | 15.2 | 125 | 0.085 | 48.1 | 0.98 | 111 | 623 | 78,300 |
| Example 3 | 4.2 | 125 | 0.590 | 51.3 | 0.97 | 111 | 398 | 62,400 |
| Example 4 | 17.7 | 124 | 0.060 | 47.5 | 0.98 | 111 | 730 | 79,200 |
| Example 5 | 13.1 | 125 | 0.072 | 49.3 | 0.98 | 111 | 681 | 74,300 |
| Example 6 | 19.5 | 125 | 0.12 | 48.6 | 0.98 | 110 | 572 | 68,100 |
| Example 7 | 16.4 | 122 | 0.028 | 48.5 | 0.98 | 108 | 722 | 78,800 |
| Example 8 | 14.5 | 123 | 0.160 | 48.3 | 0.98 | 108 | 694 | 75,500 |
| Example 9 | 12.5 | 128 | 0.043 | 49.0 | 0.98 | 108 | 676 | 74,00 |
| Example 10 | 14.6 | 127 | 0.061 | 46.3 | 0.98 | 107 | 562 | 64,500 |
| Example 11 | 13.3 | 125 | 0.08 | 43.2 | 0.97 | 108 | 785 | 79,200 |
| Comparative Example 1 | 15.0 | 90 | 0.11 | 18.2 | 0.94 | 72 | 215 | 22,000 |

What is claimed is:

1. An ionomer resin having a weight-average molecular weight of at least 5,000 and containing as the primary components:

(A) a repeating unit expressed by:

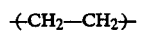

(B) a repeating unit expressed by:

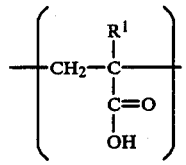

wherein $R^1$ stands for a hydrogen or halogen atom, an alkyl group having 1 to 20 carbon atoms, a cycloalkyl group having 3 to 20 carbon atoms, an aryl group having 6 to 20 carbon atoms or an aralkyl group having 7 to 20 carbon atoms, and (C) a repeating unit expressed by:

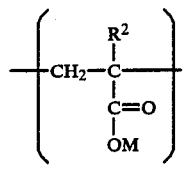

wherein $R^2$ stands for a hydrogen or halogen atom, an alkyl group having 1 to 20 carbon atoms, a cycloalkyl group having 3 to 20 carbon atoms, an aryl group having 6 to 20 carbon atoms or an aralkyl group having 7 to 20 carbon atoms, and M denotes an ion of a metal of Group I, II, III, IVA or VIII in the periodic table;

said repeating units being arranged randomly and linearly with the total proportion of said repeating units (B) and (C) contained being 0.001 to 45 mol %.

2. The ionomer resin according to claim 1 wherein the weight-average molecular weight of the resin is from 10,000 to 2,000,000.

3. The ionomer resin according to claim 1 wherein the repeating unit (B) expressed by formula II is acrylic acid unit, methacrylic acid unit, α-chloroacrylic acid unit or α-phenylacrylic acid unit.

4. The ionomer resin according to claim 1 wherein the repeating unit (C) expressed by formula III is sodium acrylate unit, potassium acrylate unit, lithium acrylate unit, calcium acrylate unit, magnesium acrylate unit, zinc acrylate unit, tin acrylate unit, aluminium acrylate unit, iron acrylate unit, sodium methacrylate unit, lithium methacrylate unit, calcium methacrylate unit, zinc methacrylate unit, tin methacrylate unit, copper methacrylate unit, aluminium methacrylate unit, iron methacrylate unit, sodium α-chloroacrylate unit, calcium α-chloroacrylate unit, lead α-chloroacrylate unit, aluminium α-chloroacrylate unit, iron α-chloroacrylate unit, sodium α-phenyl acrylate unit, calcium α-phenyl acrylate unit, zinc α-phenyl acrylate unit, tin α-phenyl acrylate unit, copper α-phenyl acrylate unit, aluminium α-phenyl acrylate unit or iron α-phenyl acrylate unit.

5. The ionomer resin of claim 4 wherein the repeating unit (C) expressed by formula III is the sodium acrylate unit.

6. The ionomer resin of claim 4, wherein the proportion of said repeating (B) and (C) is 0.1 to 20 mol % and the weight average molecular weight is from 10,000 to 2,000,000.

7. The ionomer resin according to claim 6, wherein the repeating unit (B) expressed by formula II is acrylic acid unit, methacrylic acid unit, α-chloroacrylic acid unit or α-phenylacrylic acid unit.

8. The ionomer resin according to claim 7, wherein the repeating unit (C) represents 10 to 50 mol % of the total content of repeating units (B) and (C).

* * * * *